United States Patent [19]

Yamaguchi

[11] 4,437,442

[45] Mar. 20, 1984

[54] AUTOMOTIVE VEHICLE ENGINE CONTROL SYSTEM

[75] Inventor: Hiroshi Yamaguchi, Yokosuka, Japan

[73] Assignee: Nissan Motor Company, Limited, Yokohama, Japan

[21] Appl. No.: 234,582

[22] Filed: Feb. 13, 1981

[30] Foreign Application Priority Data

Feb. 15, 1980 [JP] Japan ................................. 55-16610

[51] Int. Cl.³ .......................................... F02D 37/02
[52] U.S. Cl. .................................... 123/417; 123/325; 123/329; 123/423; 123/493
[58] Field of Search ............... 123/423, 493, 325, 416, 123/326, 417, 480, 329; 74/860

[56] References Cited

U.S. PATENT DOCUMENTS

| 3,570,460 | 3/1971 | Rabus | 123/493 |
|---|---|---|---|
| 4,022,170 | 5/1977 | Crall et al. | 123/492 |
| 4,220,125 | 9/1980 | Nishida et al. | 123/407 |
| 4,257,363 | 3/1981 | Zeller | 123/423 |
| 4,259,723 | 3/1981 | Fujisawa et al. | 123/493 |
| 4,285,314 | 8/1981 | Kiencke et al. | 123/423 |
| 4,305,365 | 12/1981 | Iizuka et al. | 123/493 |

FOREIGN PATENT DOCUMENTS

| 2615628 | 11/1976 | Fed. Rep. of Germany . |
|---|---|---|
| 2732781 | 2/1979 | Fed. Rep. of Germany . |
| 2845354 | 4/1979 | Fed. Rep. of Germany . |
| 2917412 | 11/1979 | Fed. Rep. of Germany . |
| 2917888 | 11/1979 | Fed. Rep. of Germany . |
| 2932059 | 2/1980 | Fed. Rep. of Germany . |
| 2850534 | 6/1980 | Fed. Rep. of Germany . |
| 2418346 | 9/1979 | France . |
| 1333557 | 10/1973 | United Kingdom . |
| 1447791 | 9/1976 | United Kingdom . |
| 1538277 | 1/1979 | United Kingdom . |
| 2006989 | 5/1979 | United Kingdom . |

Primary Examiner—Charles J. Myhre
Assistant Examiner—Andrew M. Dolinar
Attorney, Agent, or Firm—Schwartz, Jeffery, Schwaab, Mack, Blumenthal & Koch

[57] ABSTRACT

A system controlling the spark timing for an internal combustion engine having ignition plugs, a fuel supply control system for cutting off the fuel supply to the engine including a fuel supply cutoff delay means is disclosed.

According to the present invention, there is provided a system for controlling the spark timing comprising a means for retarding the spark timing from an optimum spark timing whose value is derived on a basis of the engine speed or engine speed and air flow rate per rotation, whereby the shock generated due to abrupt changes in engine torque when the fuel supply cutoff delay means is operated are reduced.

5 Claims, 10 Drawing Figures

COOLING WATER TEMPERATURE

AUTOMOTIVE VEHICLE ENGINE CONTROL SYSTEM

BACKGROUND OF THE INVENTION (1) Field of the Invention

The present invention relates generally to a spark timing control system for an automotive vehicle, and particularly to a system which controls the spark timing of an ignition plug provided within each combustion chamber of an internal combustion engine in order to reduce the shock due to the abrupt engine braking which occurs when fuel supply cutoff is executed during deceleration from a predetermined engine speed characteristic.

(2) Background of the Invention

In conventional fuel supply control system for an internal combustion engines for vehicles (e.g., fuel injection system, carburetor, etc.), there may be provided a function by which fuel supply cutoff is executed during a specific deceleration of the vehicle in order to improve exhaust gas purification and to save on fuel consumption.

Fuel supply cutoff may be executed during deceleration of the vehicle depending upon whether particular engine operating conditions are satisfied; e.g., whether the throttle valve in the intake manifold is in the idling position, the engine rotational speed is above a predetermined value with respect to the current cooling water temperature, etc. Although in the above-described control system the fuel supply may be repeatedly cut off and resumed depending upon the operating conditions of the vehicle, cutting off or resuming the fuel supply causes a abrupt change in the driving torque of the engine.

Consequently, the vehicle occupants are often subjected to an uncomfortable shock or jolt. For example, when fuel cutoff is executed immediately after deceleration has started, a violent shock results since abrupt engine braking is applied.

Therefore, means have been proposed for delaying the time of the fuel supply cutoff for a predetermined period of time or for a predetermined number of engine rotations. However, the fuel supply control system including the delay means described above is mounted on the engine, and the driving torque of the engine still abruptly dropped to zero when the fuel supply is cut off so that an uncomfortable shock is generated even in this state.

SUMMARY OF THE INVENTION

It is therefore is an object of the present invention to provide a system for controlling ignition spark timing so as to reduce the shock generated due to abrupt change in the driving torque of engine when the fuel cutoff is started after delay, by fuel cutoff delay means, of the fuel supply control system.

According to the present invention, there is provided a system of controlling the spark timing wherein a means is provided for retarding the actual spark timing with respect to an optimum spark timing value, so that the engine torque is gradually reduced to zero and thus the shock is rendered.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The features and advantages of the system of controlling an engine spark timing will be better appreciated from the following drawings, taken in conjunction with the accompanying specification, in which.

DESCRIPTION OF PREFERRED EMBODIMENT

Figure 1:
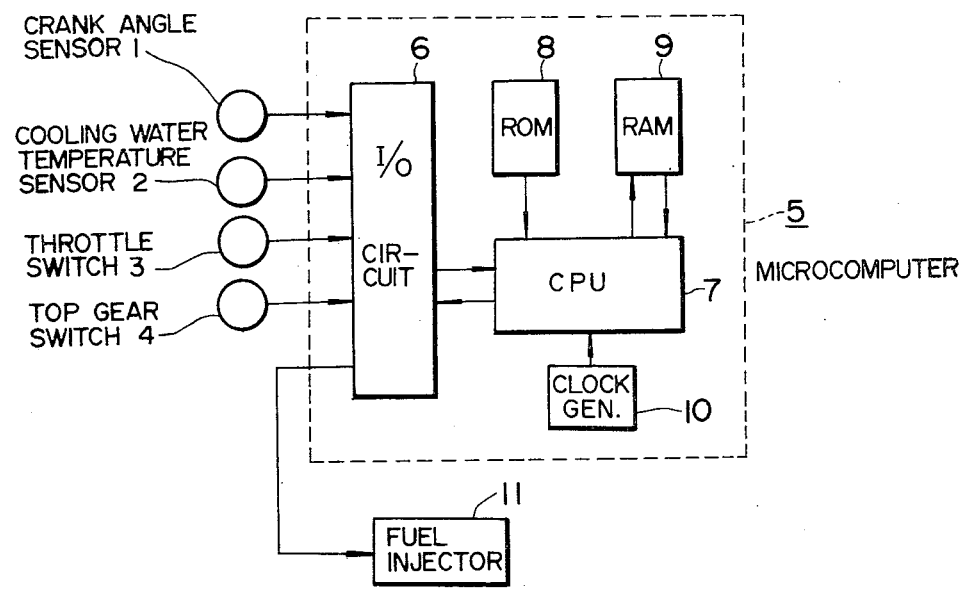
FIG. 1 illustrates a microcomputer system of controlling the fuel supply to a fuel injector, etc.

Referring now to the drawings, and first to FIG. 1 where a fuel supply control system having a fuel supply delay means is illustrated.

Figure 2:
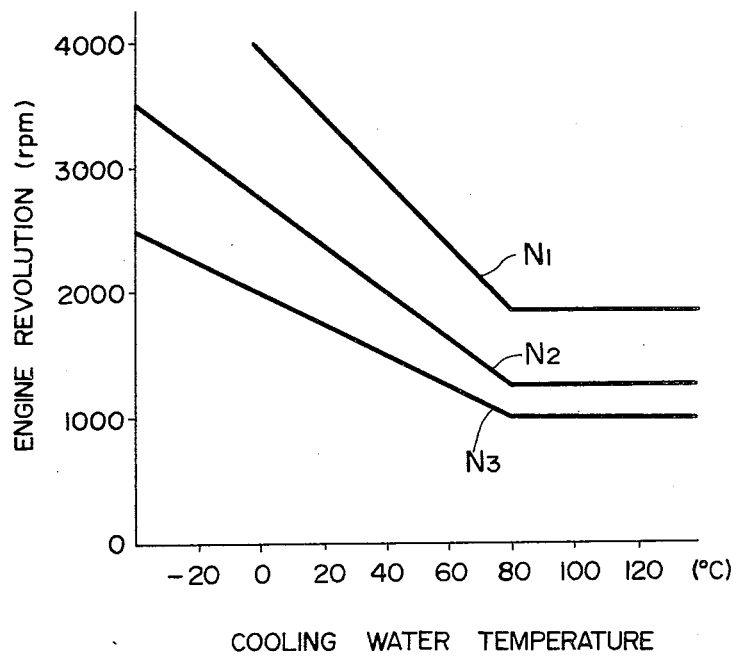
FIG. 2 illustrates a graph of an engine rotational speed with respect to an engine cooling water temperature showing fuel supply cutoff and fuel supply reestablishing predetermined values.

In FIG. 1, numeral 1 denotes an engine rotation speed detecting means such as a crank angle sensor for outputting a pulse signal every time the crank shaft rotates through a unit of angle. Numeral 2 denotes a cooling water temperature sensor for detecting a temperature of the cooling water circulated around the engine, e.g., a thermistor provided within a water jacket. Numeral 3 denotes a throttle switch for detecting whether the throttle valve in the intake manifold of the engine is closed fully or opened at an appropriate angle. Numeral 4 denotes a top gear switch for detecting whether the transmission gear lever is placed at a top speed range. Numeral 5 denotes a microcomputer comprising an I/O circuit 6 (Input/Output circuit), a central processing unit 7 (CPU), a read only memory 8 (ROM), a read/write memory (RAM), and a clock generator 10 for outputting a timing signal to which the execution of a series of arithmetic operations is referred. Numeral 11 denotes a fuel injection valve, located at the intake manifold, which injects the fuel in a fine spray into the engine combustion chamber under constant pressure so that the fuel injection rate per unit of time is determined by only its opening time, that is, a pulse width of the incoming signal. The microcomputer 5 executes fuel supply cutoff by interrupting the fuel injection pulse signal when:

the throttle valve is changed in the fully closed position and the engine speed is at a higher value than $N_2$ as shown in FIG. 2.

When this condition is satisfied, the fuel supply cutoff is executed immediately provided that the transmission gear lever is placed at the top speed range. If the transmission is not in high gear, fuel supply cutoff is executed only after a predetermined delay of time or after the engine has rotated a predetermined number of rotations.

The time of fuel supply cutoff with such a delay becomes shorter in a predetermined manner from the time when the fuel supply cutoff condition is satisfied, thereby reducing the uncomfortable shock or jolt received when the fuel supply cutoff is executed. Furthermore, if the time during which the throttle valve is completely closed is shorter than the delay time, the fuel supply is not cut off. Therefore, when the throttle valve is repeatedly opened and closed to maintain the vehicle speed constant while the vehicle is moving at a low speed, the fuel will not be cut off and unpleasant jolting will be avoided.

Furthermore, when the transmission is in top gear, driving torque is less and the shock is reduced so that fuel supply cutoff can be carried out without delay.

If the engine speed goes below $N_3$ shown in FIG. 2 or if the throttle valve is opened, (i.e. not in the idling position), the fuel supply is resumed.

Figure 3A:
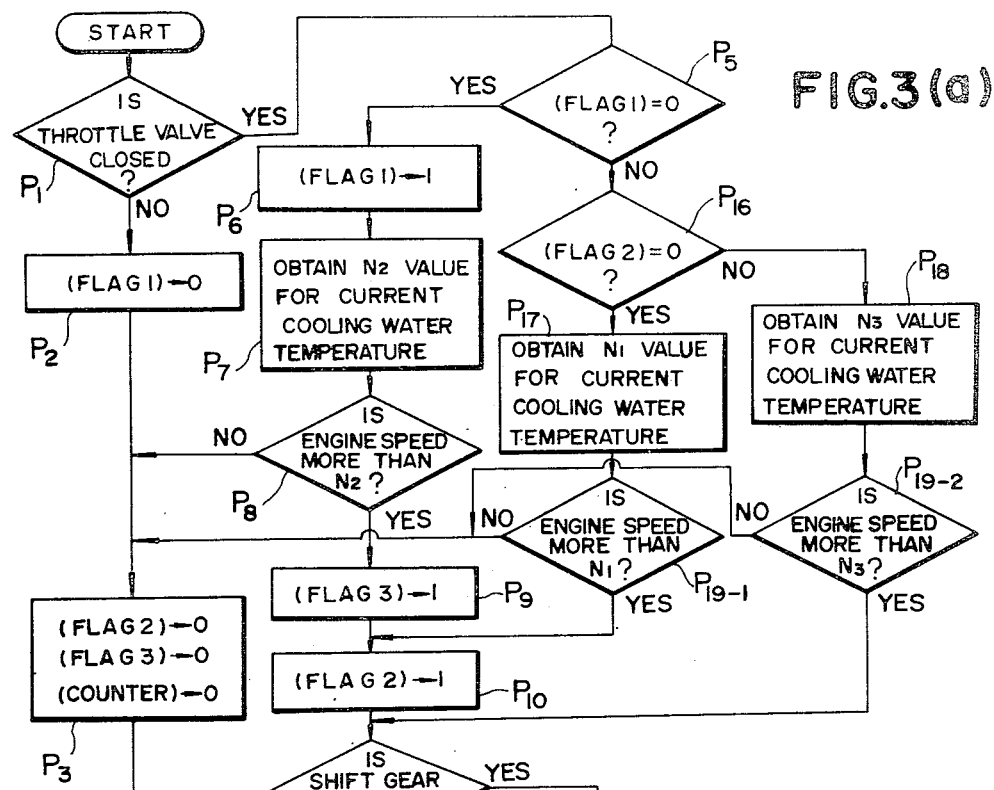
FIGS. 3(a) and (b) illustrate processing flowcharts of the fuel supply controlling system including the fuel cutoff delay means.

Referring to FIGS. 3(a) and (b), the fuel cutoff processing routine by the microcomputer system 5 will be described.

FIG. 3(a) illustrates a flowchart showing a processing routine to determine whether the fuel supply should be cut off or not depending on results of an arithmetic operation.

Figure 3B:
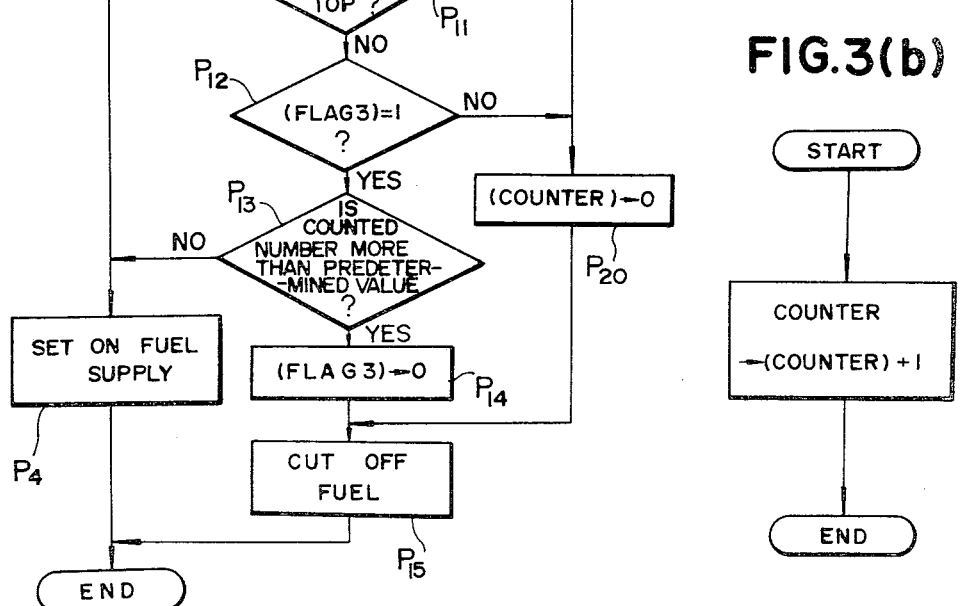

FIG. 3(b) illustrates another flowchart showing a processing routine to count the time delay.

In FIG. 3(a), flag 1 indicates whether the throttle valve has completely closed or not at the time when each execution of the routine shown in FIG. 3(a) has finished.

If the flag 1 indicates "1", the throttle valve is still fully closed in the instantaneous arithmetic operation time.

If the flag 1 indicates "0", the throttle valve is not completely closed in the instantaneous arithmetic operation.

Flag 2 is set in each execution to indicate whether the microcomputer 5 has determined to execute fuel supply cutoff in the previous arithmetic operation. If the flag 2 indicates "1", the microcomputer 5 has determined to cut off the fuel supply. If the flag 2 indicates "0", the microcomputer 5 has determined not to execute fuel supply cutoff.

Flag 3 indicates whether the fuel supply cutoff is currently being delayed or not.

If the flag 3 indicates "1", the fuel supply cutoff is not currently being delayed.

If the flag 3 indicates "0", the fuel supply cutoff is currently being delayed.

First, the microcomputer 5 determines whether the throttle valve is completely closed or not in step P1 depending on whether the throttle valve switch 3 is in the ON state (the throttle valve is fully closed). If not, the microcomputer 5 sets flags 1, 2, and 3 and a counter to zero in step P2 and step P3. Thereafter, the microcomputer 5 continues the fuel supply in step P4.

If the throttle valve is completely closed, the microcomputer 5 checks to see if the flag 1 indicates "1" or not in step P5. If the flag 1 indicates "0", the throttle valve was not been closed fully in the preceding execution but is completely closed in the current execution. In this case after the flag 1 is set to "1" in step P6, the microcomputer 5 obtains the value of $N_2$ ($N_2$ characteristic illustrated by a solid line in FIG. 2) corresponding to the current cooling water temperature. In step P8, the microcomputer 5 determines whether the engine speed is higher than $N_2$. If the engine speed is not more than $N_2$, the engine speed does not comply with the condition described above, so the microcomputer 5 goes to steps P3 and P4, continuing the fuel supply. If the answer is "yes" in step P8, the flags 2 and 3 are set to "1" in steps P9 and P10.

Next, the microcomputer 5 determines whether the transmission gear lever is at the top speed range or not in step P11. If found at the top speed range, the counter is cleared immediately in step P11 and the microcomputer 5 operates the fuel cut off in step P15.

Conversely, if not at the top speed range, the microcomputer 5 reads the value of flag 3 (whether the flag 3 indicates "1" or not) in step P12. If the flag 3 indicates "0", the fuel supply cutoff is not currently being delayed and the counter is cleared in step P20 and the microcomputer 5 goes to the step P15 immediately. If flag 3 indicates "1" in step P12, the fuel supply cutoff is currently being delayed. In this case, the microcomputer 5 checks to see in step P13 whether the counter value has reached a predetermined value or not. If the answer is "no" in step P13, the fuel cutoff delay is currently being executed, that is to say, the predetermined delay has not elapsed. In this case, the microcomputer continues the fuel supply in step P4. If the answer is "yes" in step P13, it indicates that the predetermined period of time has elapsed. After the flag 3 is set to "0" in step P14, the microcomputer 5 executes the fuel cutoff in step P15.

If the flag 1 indicates "0" in step P5, the throttle valve is and has been in the completely closed state in this and the preceding executions. In this case, the microcomputer 5 reads the state of the flag 2 in step P16. If the flag 2 indicates "0", this indicates that the microcomputer 5 has not made a decision to cut off the fuel supply in the previous execution.

In this case, the microcomputer 5 obtains the value of $N_1$ ($N_1$ characteristic line as shown in FIG. 2, corresponding to the cooling water temperature at that time and checks to see whether the engine speed is at least $N_1$ or not in step P19-1. If the engine speed is less than $N_1$ in step P19-1, the condition described above is not satisfied, and the microcomputer 5 goes to step P4 via step P3 and decides not to execute the fuel supply cutoff. If the engine speed exceeds $N_1$ in step P19-1, the condition described above is satisfied and the microcomputer 5 proceeds to step P10. In this case, the steps from P10 on to be processed are executed in the same way as described above, but since the flag 3 is set to "0", the microcomputer 5 determines an immediate fuel supply cutoff is appropriate. In other words, if the engine rotation number per minute (rpm) exceeds the value of $N_1$ with the throttle valve completely closed, an immediate fuel supply cutoff is carried out, because, for example, when the automotive vehicle is going downhill, the shock to be received is reduced. If the flag 2 indicates "1" in step P16, this means that the microcomputer 5 has decided to cut off the fuel supply in the previous arithmetic operation. In step P18, the microcomputer 5 obtains the value of $N_3$ for the current cooling water temperature. In step P19-2, the microcomputer 5 checks to see whether the engine speed is equal to or greater than the value of $N_3$ obtained in step P18. If the answer is "No" in step P19-2, this indicates that the engine speed becomes equal to or greater than the value of $N_3$ obtained in step P18. If the answer is "No" in step P19-2, this indicates that the engine speed is reduced and arrives at the value of $N_3$ and thus the condition to end the fuel supply cutoff is satisfied. At this time, the microcomputer 5 goes to steps P3 and P4 and reestablishes the fuel supply. If the answer is "yes" in step P19-2, the microcomputer 5 goes to step P11 and its following steps where the fuel supply cutoff is continued.

In the routine shown in FIG. 3(a), when the transmission gear lever is placed in a lower speed range other that of the top gear, the engine speed is greater than or equal to the value of $N_2$, and the throttle valve is turned to the fully closed state in this execution, the microcomputer 5 runs exactly once through the processing sequence P1-P5-P6-P7-P8-P9-P10-P11-P12-P13-P4. After the end of this processing sequence, the microcomputer 5 runs through the processing sequence P1-P5-P16-P18-P19-2-P11-P12-P13-P4 until the count value of the counter exceeds a predetermined value (if the predetermined value is in units of time, it may correspond to the time from 0.1 sec to 0.5 sec and if in units of rotation, 2 to 10 rotations), and thus a predetermined delay is brought about.

When the counter value is advanced and arrives at a predetermined value corresponding to the predetermined delay, the microcomputer 5 runs exactly once through the processing sequence P1-P5-P16-P18-P19-2-P11-P12-P13-P14-P15. Next the microcomputer 5 changes the processing sequence to P1-P5-P16-P18-P19-2-P11-P12-P20-P15. If the transmission gear lever is placed in the top speed range, the processing sequence is P11-P20-P15 after either the sequence of, P1-P5-P6-P7-P8-P9-P10 or P1-P5-P16-P18-P19-2 without any delay.

FIG. 3(b) shows a routine for the counter which is incremented one each time the routine shown in FIG. 3(a) is executed. Therefore, if the arithmetic operation is executed at fixed time intervals (synchronized with clock pulses of a fixed frequency), the count value is directly proportional to time. On the other hand, in the case where the arithmetic operation is carried out at intervals of a predetermined number of engine rotations (synchronized with clock pulses corresponding to the engine rotation), the count value is proportional to the total number of engine rotations.

The flowcharts of FIGS. 3(a) and (b) exemplify the arithmetic operation in the case where a delay is not provided if the transmission gear lever is not at the top speed range. If the step of P11 is omitted, the delay can be provided regardless of the state of the transmission gear lever.

In addition, if the increment limit value for the counter is varied according to the driving conditions of the engine (e.g., the delay time is made longer when he engine is rotating at high speeds), the delay time can be changed to different values appropriate for the driving conditions.

However, if a fuel supply control system is used which cuts off the fuel supply when the engine is decelerated from a speed, higher than a predetermined speed, with a predetermined delay, an abrupt shock will occur since the torque generated from the engine is suddenly reduced to zero.

Figure 4:
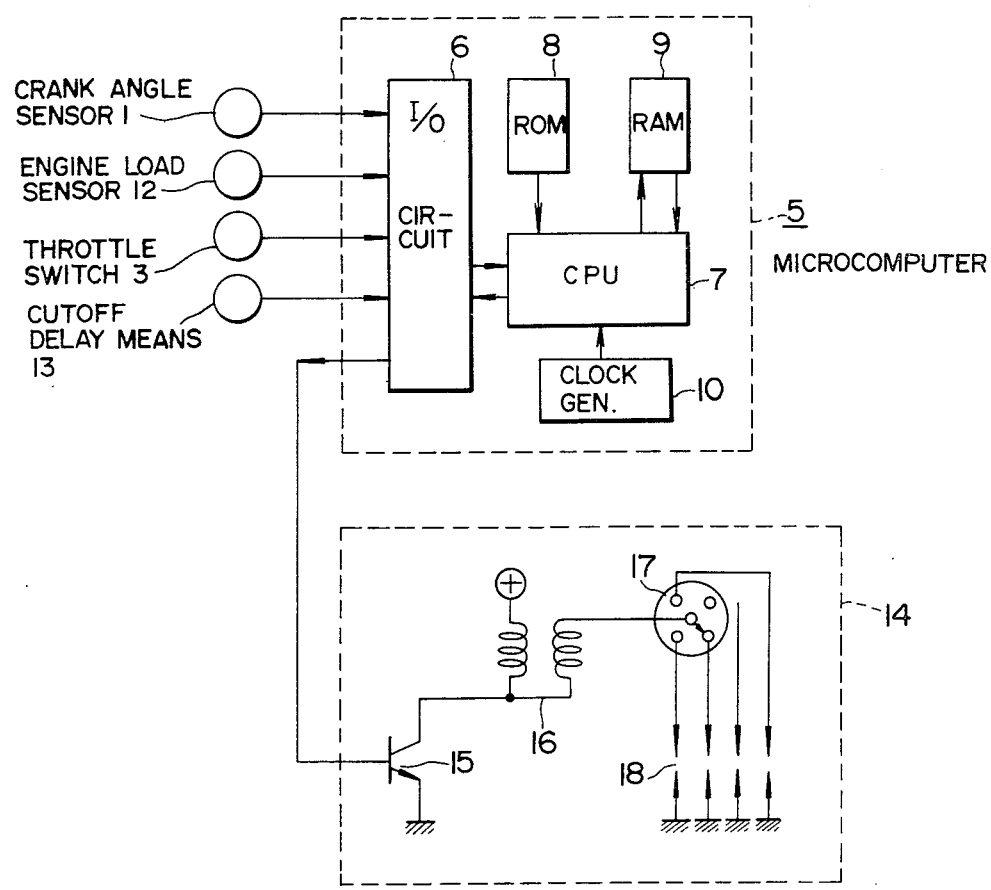
FIG. 4 illustrates an ignition plug spark timing control system according to the present invention.

FIG. 4 illustrates a schematic diagram of one embodiment of a spark timing control system according the present invention.

As shown in FIG. 4, the construction of the spark timing control system is almost the same as the fuel supply control system having a fuel supply cutoff delay means as shown in FIG. 1.

In FIG. 4, the crank angle sensor 1 outputs a reference position signal every time the crank shaft rotates through a predetermined angle (e.g., 180 degrees (°) for a four-cylinder engine, 120 degrees (°) for a six-cylinder engine) and outputs an angular signal every time the crank shaft rotates through a unit of angle (e.g., 1 degree (°)). Numeral 12 denotes an engine load sensor for detecting the state of load applied to the engine, e.g., an air flow meter for detecting an intake air amount. Numeral 13 denotes a fuel supply cutoff delay detector for detecting whether the fuel supply control system is providing a delay for the fuel supply cutoff by ensuring that the flag 3 of the fuel supply control system is set to "1" as described hereinbefore. Numeral 14 denotes an ignition device comprising a transistor whose base is connected to the I/O circuit 6. Numeral 16 denotes an ignition coil. Numeral 17 denotes a distributor. Numeral 18 denotes an ignition plug disposed for each cylinder. The microcomputer 5 inputs signals from the crank angle sensor 1, engine load sensor 12, throttle switch 3, and cutoff delay detector 13 and outputs an ignition signal generated according to each arithmetic operation described hereinafter. The ignition signal is sent to the transistor 15 to turn it on or off at the required time to produce sparks at the ignition plugs 18.

In more detail, an optimum spark timing value corresponding to an engine rotation number and intake air flow rate (an angle from a reference point, e.g., a top dead center) is stored previously into the ROM 8. Then, whenever a reference position signal is inputted into the microcomputer 5, an optimum spark timing value is read out from the ROM 8 which corresponds to the current engine rotation number calculated from the angular signal and intake air flow rate from the engine load sensor 12. When the optimum value coincides with the accumulated value of the angular signal at a time when the reference position signal is received, the ignition pulse signal is outputted. The ignition pulse signal turns off the transistor 15 and thus a high voltage is generated into the ignition coil 16 to create sparks at the ignition plugs 18.

Figure 5:
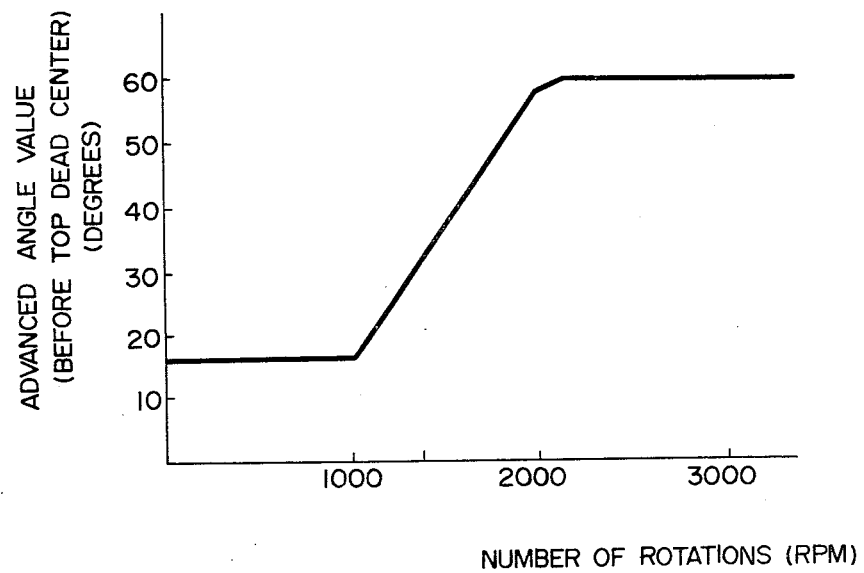
FIG. 5 illustrates a graph of a value of advance angle with respect to a top dead center of the engine piston (Before Top Dead Center) changed according to engine rotational speed.
Figure 6:
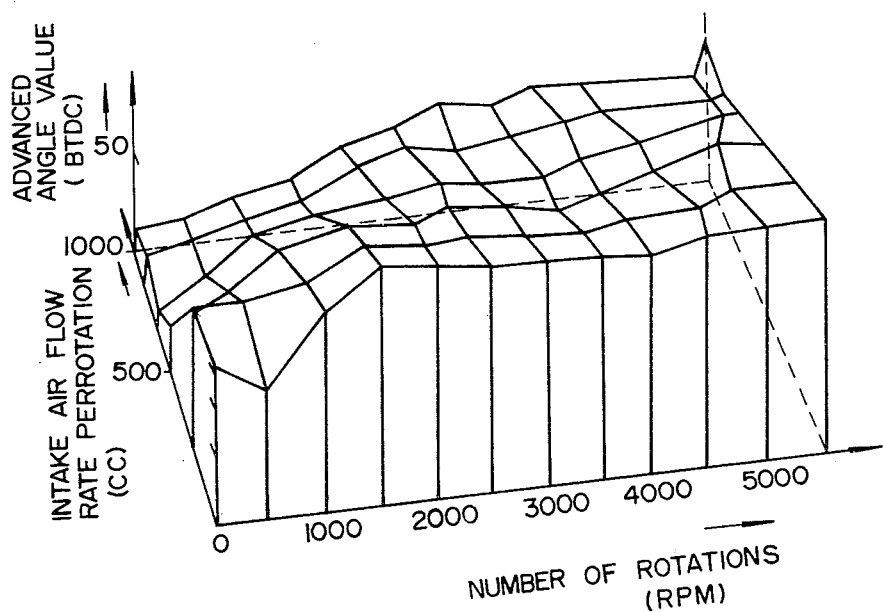
FIG. 6 illustrates a three-dimensional graph of a value of advance angle with respect to a top dead center (BTDC), intake air flow rate per rotation, and the number of engine rotations per minute.

The optimum spark timing value is obtained from a value stored in the ROM 8 corresponding to the number of engine rotations as shown by FIG. 5, e.g., when the throttle valve is fully closed. The solid line as shown in FIG. 5 is hereinafter referred to as a first characteristic. When the throttle valve is not fully closed, the optimum spark timing value is searched for from among values stored in the ROM 8 as a value corresponding to the number of engine rotations and intake air flow rate stored in the ROM 8 as shown in FIG. 6. The solid lines in FIG. 6 are hereinafter referred to as a second characteristic.

The microcomputer 5 decides to delay the spark timing from the optimum spark timing value when the fuel supply cutoff delay detector 13 sends a signal into the I/O circuit 6 of the microcomputer 5. Since the torque generated from the engine is reduced when the spark is timed to occur shortly after the optimum spark timing, abrupt torque variations can be relieved by retarding the spark when the fuel supply is cut off after the cutoff delay time has elapsed, thus the heretofore unpleasant shock is reduced remarkably. If the angular value of delay of the spark timing is increased stepwise in accordance with time from when the cutoff delay time is started, the torque generated by the engine is gradually reduced so that a smoother control over the torque variation is performed.

Figure 7:
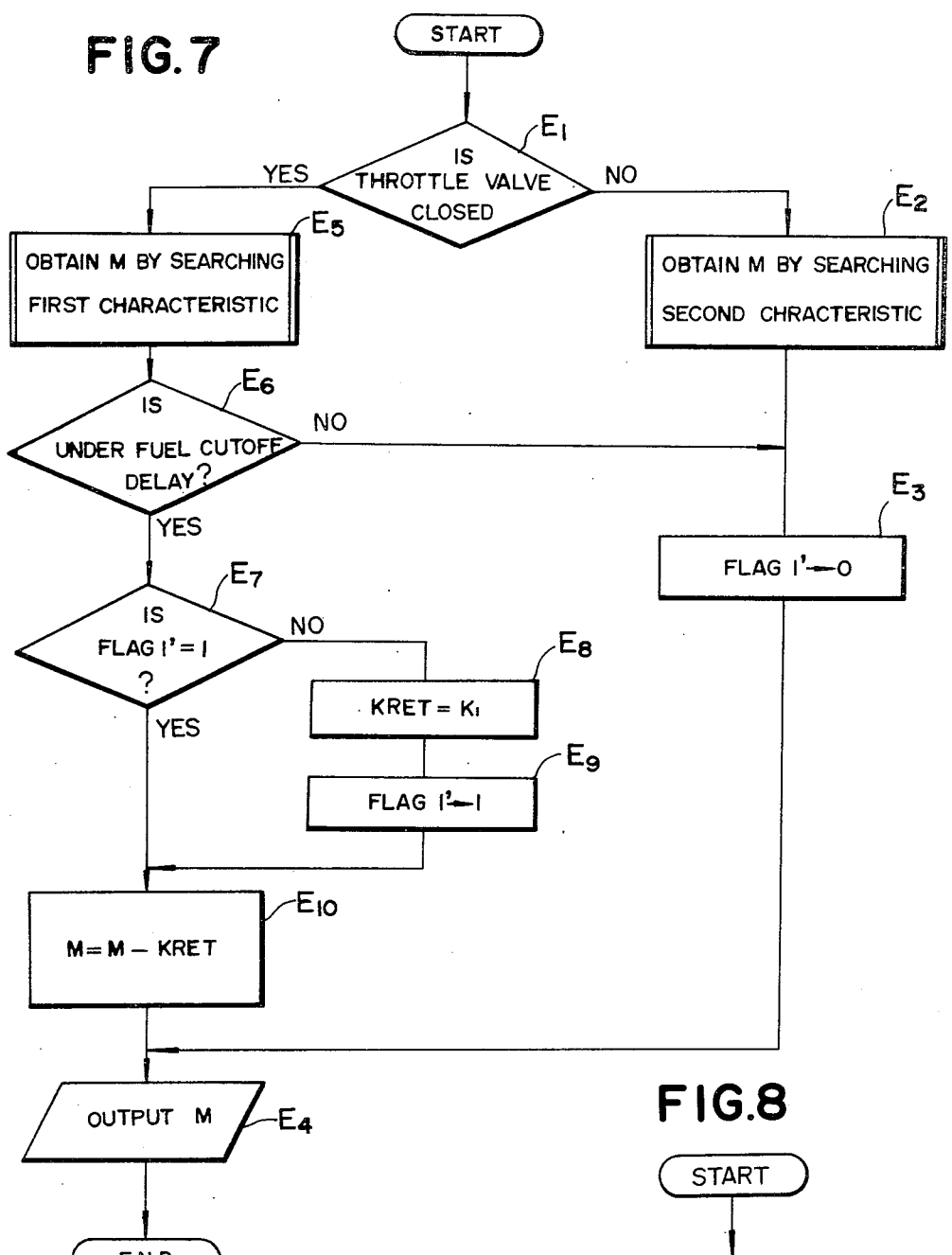
FIGS. 7 and 8 illustrate processing flowcharts which the system of controlling the spark timing executes.
Figure 8:
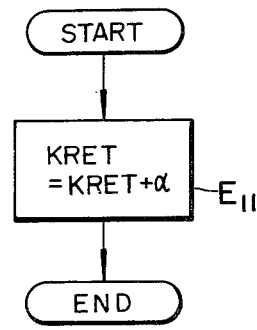

On the basis of the flowcharts in FIGS. 7 and 8, the contents of arithmetic operations in the microcomputer 5 will now be described in more detail. A flag 1' indicates that an arithmetic operation to delay the spark timing was performed in the previous arithmetic operation. If the flag 1' indicates "0", the arithmetic operation to delay the spark timing is to be performed, that is, it is the first time to delay the spark timing. It is to be noted that the arithmetic operation of each flowchart shown in FIG. 7 and FIG. 8 is synchronized with a predetermined interval of time or a predetermined number of engine rotations.

In more detail, the microcomputer 5 checks to see whether the throttle valve is fully closed in step E1. If not fully closed, the microcomputer 5 goes to step E2 where an optimum spark timing value M is searched for from the first characteristic in FIG. 6. After the flag 1' is set to "0" in step E3, the microcomputer 5 goes to step E4 to output the value of M as the spark timing value.

If the throttle valve is fully closed, the microcomputer 5 goes to step E5, searching for the optimum spark timing value M corresponding to the current number of engine rotations from the first characteristic shown in FIG. 2.

Next, the microcomputer 5 determines whether the fuel supply cutoff is being delayed in step E6. If not, the microcomputer 5 goes to step E4 via the step E5.

If fuel supply cutoff is being delayed in step E6, the microcomputer 5 goes to step E7 to see if the flag 1' is set to "1". If the flag 1' is set to "0" in step E6, the microcomputer 5 begins to retard the spark timing so that in step E8 a retard amount of the spark timing KRET is set to an initial value $K_1$ and the flag 1' is set to "1". Thereafter, the microcomputer 5 goes to step E10 from step E9.

In step E10, the value M obtained in step E5 is subtracted by the retard amount KRET. The subtracted result is outputted as the spark timing value in step E4.

This retard amount KRET is calculated as shown in FIG. 8. In step E11 the retard amount KRET in the previous arithmetic operation is supplemented by an angle $\alpha$ to obtain the retard amount KRET in the current arithmetic operation. Therefore, the retard amount KRET has an initial value $K_1$ and is incremented by $\alpha$ every time the arithmetic operation is repeated.

Figure 9:
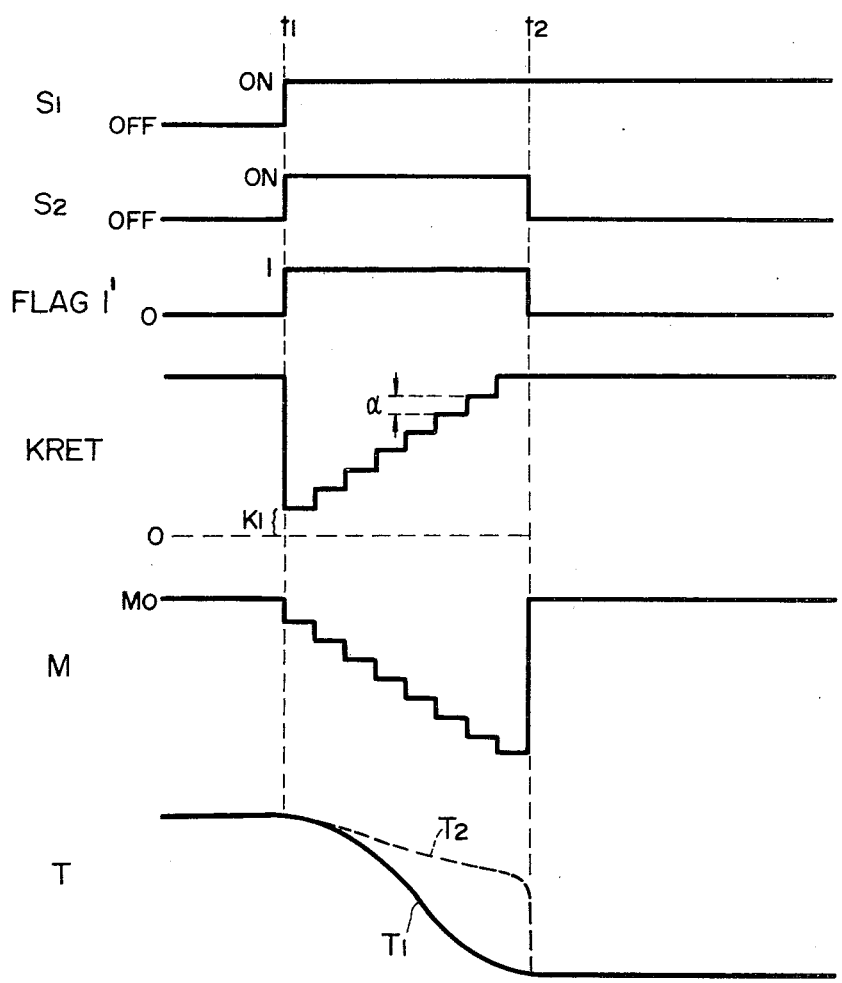
FIG. 9 illustrates an engine driving torque characteristic when the system for controlling the spark timing is executed as compared with a conventional spark timing control system.

FIG. 9 illustrates a timing diagram of each signal when the arithmetic operation described above is performed, where at a time $t_1$ the engine brake is applied and simultaneously the fuel supply cutoff delay is executed and at a time $t_2$ the fuel supply cutoff delay is ended to start the actual fuel supply cutoff.

In FIG. 9, S1 denotes a signal derived from the throttle valve switch 3 (when the signal is in the ON state, the throttle valve is fully closed), S2 denotes a signal derived from the fuel supply cutoff detector 13 (when the signal is in the ON state, the fuel supply cutoff delay is operated), KRET denotes a value of the retard amount of the spark timing, M denotes a spark timing value to be outputted (Mo denotes an optimum spark timing value) and T denotes an output torque from the engine (The solid line $T_1$ denotes a characteristic when the spark timing control system according to the present invention is applied and $T_2$ a characteristic when the conventional system is applied).

As shown by M and T in FIG. 9, the output torque of the engine is smoothly reduced when the spark timing is gradually delayed. Consequently, even when the fuel supply cutoff is started at the time $t_2$, the shock due to the abrupt change in the torque does not develop.

In the preferred embodiment described above, the spark timing is gradually delayed as the time passes. In the case when the retard amount is held constant, the effect is almost the same. In this case, the microcomputer 5 need not process the routine of the flowchart shown in FIG. 9.

As described above, according to the present invention, an unpleasant shock such as jolting can be prevented which occurs even when the fuel supply cutoff is started after the fuel supply cutoff delay is performed.

It should be fully understood by those skilled in the art that the foregoing description is in terms of preferred embodiments of the present invention wherein various changes and modifications may be made without departing from the spirit and scope of the present invention, which is to be defined by the appended claims.

What is claimed is:

1. An automotive engine control system for controlling fuel supply and ignition spark timing of an engine having a means for cutting off the fuel supply during engine operation, comprising:
   (a) a throttle valve position detecting means for detecting the position of a throttle valve and operative to indicate a closed state of said throttle valve;
   (b) an engine speed detecting means for detecting engine speed;
   (c) an engine cooling water temperature detecting means for detecting engine cooling water temperature;
   (d) a spark advance angle calculating means for calculating an optimum spark advance angle of said ignition spark timing with respect to a top dead center position of each piston of said engine from said engine speed detecting means while said throttle valve position detecting means detects the closed state of the throttle valve;
   (e) a fuel supply cutoff delay decision means for deciding to delay actual fuel supply cutoff when (a) said speed detecting means detects the engine speed exceeds a first predetermined engine speed characteristic based upon the cooling water temperature detected by said temperature detecting means, and (b) said position detecting means detects a change in the throttle valve position from an open state to a closed state, said first predetermined engine speed characteristic being higher than a second predetermined engine speed characteristic wherein the fuel supply is resumed;
   (f) a delay executing means responsive to said delay decision means for providing a predetermined delay prior to actual fuel cutoff; and
   (g) a spark advance angle retarding means operative to retard the optimum spark advance angle calculated by said calculating means while said delay executing means executes the predetermined delay of the actual fuel cutoff.

2. The automotive vehicle engine control system of claim 1, wherein said retarding means retards the calculated optimum spark advance angle in predetermined increments from the calculated optimum spark advance angle during a time period corresponding to said predetermined delay prior to fuel supply cutoff.

3. The automotive vehicle engine control system of claim 1, wherein said spark advance angle retarding means retards the calculated optimum spark advance angle in predetermined increments from the calculated optimum spark advance angle during engine rotation through a predetermined number of revolutions corresponding to the predetermined delay prior to fuel supply cutoff.

4. The automotive vehicle engine control system of claim 1, further comprising a transmission gear position detecting means for detecting a gear position of a transmission gear associated with said engine and wherein said delay executing means provides the predetermined delay for an actual fuel cutoff, in response to the decision of said cutoff delay decision means when said gear position detecting means detects the transmission gear is placed at other than a top gear range.

5. A method of controlling ignition spark timing of an engine having a plurality of detecting means including an engine speed detecting means, an engine load detecting means, an engine cooling water temperature detecting means, a throttle valve position detecting means and a microcomputer which monitors said plurality of detecting means and controls engine fuel supply and ignition timing and means for cutting off the fuel supply during engine operation, said microcomputer including memory means for storing a first look-up table relating engine cooling water temperature and first and second predetermined engine speed characteristics with fuel cutoff based upon timing of the throttle valve closed state, and a third predetermined engine speed characteristic with fuel supply resumption, and a second look-up table relating engine speed and optimum spark advance angle at no engine load, and a third look-up table relating both engine speed and load condition with another optimum spark advance angle, comprising the steps of:

(a) detecting the throttle valve position;
(b) obtaining the second predetermined engine speed characteristic from the detected cooling water temperature by means of the first look-up table when the detected position of throttle valve changes from an open state to a closed state;
(c) detecting the engine speed;
(d) determining whether the detected engine speed exceeds the second predetermined characteristic;
(e) deciding to delay the cutoff of the fuel supply when the engine speed exceeds the second predetermined engine speed characteristic;
(f) executing a predetermined delay of actual fuel cutoff in response to said decision;
(g) retarding the spark ignition angle from the optimum spark advance angle obtained from the second look-up table while the actual fuel supply cutoff is delayed.

* * * * *